US008621606B1

(12) United States Patent
Ferrie

(10) Patent No.: US 8,621,606 B1
(45) Date of Patent: Dec. 31, 2013

(54) SYSTEMS AND METHODS FOR IDENTIFYING EXTERNAL FUNCTIONS CALLED BY UNTRUSTED APPLICATIONS

(75) Inventor: Peter Ferrie, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1468 days.

(21) Appl. No.: 11/967,570

(22) Filed: Dec. 31, 2007

(51) Int. Cl.
*G06F 21/00* (2013.01)

(52) U.S. Cl.
USPC ............................. 726/22; 713/164; 713/187

(58) Field of Classification Search
USPC ...................................................... 726/23, 22
See application file for complete search history.

(56) References Cited

U.S. PATENT DOCUMENTS

| 6,728,963 | B1 | 4/2004 | Forin et al. | |
|---|---|---|---|---|
| 6,851,057 | B1 | 2/2005 | Nachenberg | |
| 7,428,726 | B1 * | 9/2008 | Cowan et al. ................ | 717/122 |
| 7,779,472 | B1 * | 8/2010 | Lou ................ | 726/24 |
| 2002/0160784 | A1 * | 10/2002 | Kuwahara et al. ............ | 455/452 |
| 2004/0199827 | A1 * | 10/2004 | Muttik et al. .................. | 714/38 |
| 2004/0230949 | A1 * | 11/2004 | Talwar et al. ................ | 717/118 |
| 2004/0255165 | A1 * | 12/2004 | Szor ................ | 713/201 |
| 2005/0144608 | A1 * | 6/2005 | Oyama et al. ................ | 717/162 |
| 2008/0028388 | A1 * | 1/2008 | Burtscher ................ | 717/174 |
| 2008/0263669 | A1 * | 10/2008 | Alme ................ | 726/24 |
| 2010/0251378 | A1 * | 9/2010 | Eker et al. ................ | 726/26 |

FOREIGN PATENT DOCUMENTS

WO    WO 2008074483 A1 *   6/2008

OTHER PUBLICATIONS

Eagle, Chris, "Attacking Obfuscated Code with IDA Pro", Jul. 9, 2004, retrieved from "http://www.blackhat.com/presentations/bh-usa-04/bh-us-04-eagle.pdf".*

* cited by examiner

*Primary Examiner* — Mohammad L Rahman
(74) *Attorney, Agent, or Firm* — ALG Intellectual Property, LLC

(57) ABSTRACT

A computer-implemented method for identifying external functions called by an untrusted application may comprise loading an untrusted application into an emulated computing environment, executing a first computer-readable instruction of the untrusted application within the emulated computing environment, intercepting a request to access an external-function-specific region of memory, and identifying, by analyzing the request, an external function to be called by the first computer-readable instruction. The method may also comprise identifying an address associated with the external function and/or identifying a name associated with the external function. The name associated with the external function may be used to recreate an import table for the untrusted application. Corresponding systems and computer-readable media are also disclosed.

15 Claims, 9 Drawing Sheets

SYSTEMS AND METHODS FOR IDENTIFYING EXTERNAL FUNCTIONS CALLED BY UNTRUSTED APPLICATIONS

BACKGROUND

In many operating systems, various efficiencies may be achieved by sharing a single library containing code, data, or other resources between multiple applications or programs. Computer files that rely on functions offered by such shared libraries typically contain, within a section of the file, a list of the names of each of the functions of the shared library that will be imported or "called" by the file. In certain files, this list of function names may be contained within a table known as an import table.

In recent years, various malware applications have attempted to obfuscate the names of the functions that are to be called or imported by the application from a shared library, such as a dynamic-link library (DLL), in an attempt to disguise the illegitimate intent or purpose of the malware application. Certain malware applications have accomplished this by replacing the names of the functions to be imported or called by the malware application with a list of checksums. In this example, the malware application may identify the function to be called from the shared library by calculating checksums for each function offered by the shared library (based on each function's export address, which may be contained in the shared library's export address table) and then searching the list of checksums contained within the malware application for a checksum that matches one or more of the calculated checksums.

Previous attempts to identify the names of the functions that are called by such malware applications have involved identifying each exported function offered by an operating system, calculating a checksum for each of these exported functions, and then comparing each of these calculated checksums to the list of checksums contained in the malware application in an attempt to identify a match. Unfortunately, this approach is inefficient, slow, and resource intensive. Moreover, if the requisite shared libraries are not present, this approach may be unable to identify each of the functions called or imported by the malware application.

SUMMARY

As will be described in greater detail below, embodiments of the instant disclosure may be used to identify functions that are called or imported by an untrusted application from an external source such as a shared library or DLL (hereafter "external functions"). For example, external functions called or imported by an untrusted application from a shared library may be identified by loading the untrusted application into an emulated computing environment, executing a first instruction of the untrusted application within the emulated computing environment, intercepting a request to access a region of memory that corresponds to external functions offered by the shared library (such as an export address table of the shared library) and identifying, by analyzing the request, an external function to be called or imported by the untrusted application. In certain embodiments, loading and executing the untrusted application within an emulated computing environment may comprise loading and running the untrusted application within a buffer.

The external function to be called by the untrusted application may be identified by monitoring a region of memory that corresponds to an export address table for the shared library and then identifying each specific memory location within this region of memory that is accessed by the untrusted application. An entry in the export address table for the shared library that corresponds to the memory location accessed by the untrusted application may then be identified. Upon identifying this entry in the export address table, the name of the function may be determined by identifying an entry in an export name table of the shared library that is associated with the entry in the export address table that corresponds to the specific memory location accessed by the untrusted application. This entry in the export name table may identify, or point to, the name of the external function called by the untrusted application.

The method may also comprise storing the names of each of the identified external functions in a private buffer and then creating or recreating an import table for the untrusted application based on these names. This recreated import table may comprise an import name table and/or an import address table. The identified external functions may represent operating-system services, functions offered by shared libraries, such as a DLL, or any other external function. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
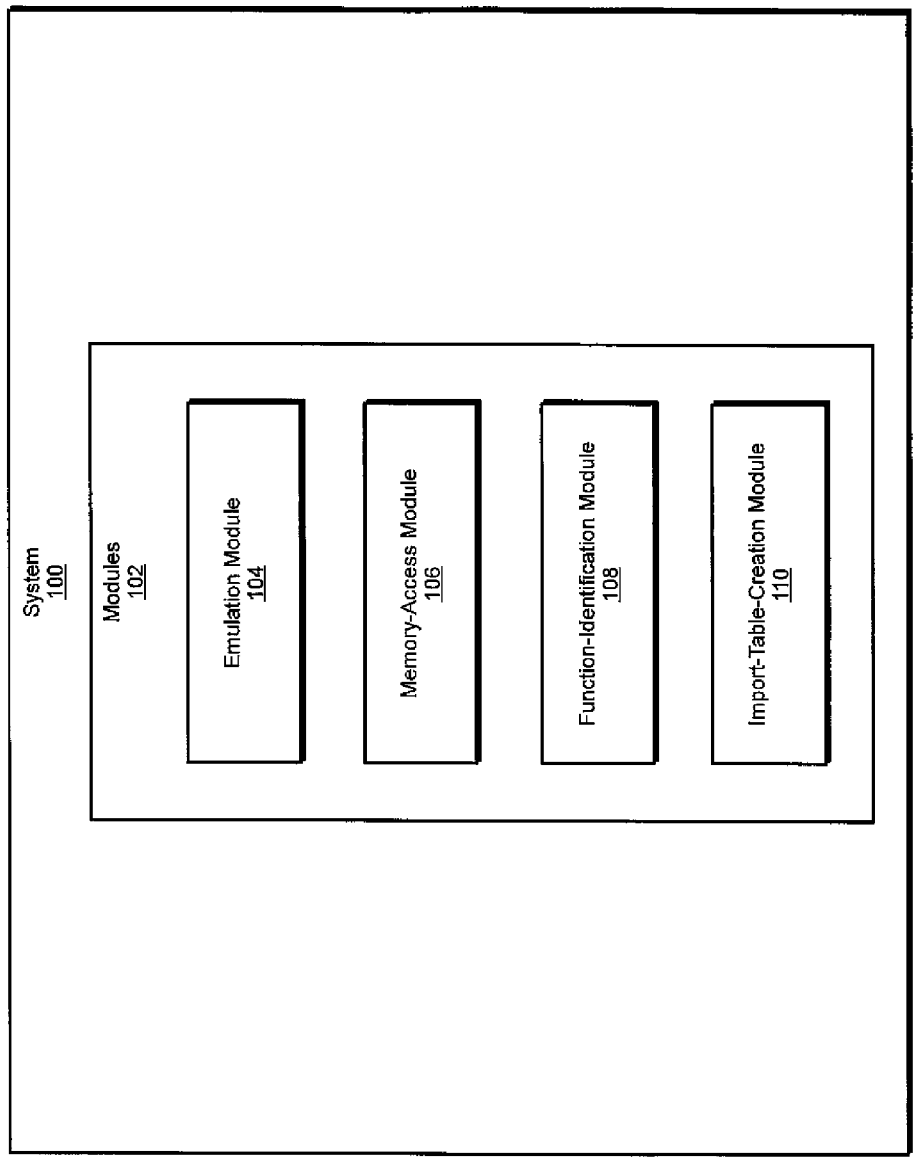
FIG. 1 is a block diagram of an exemplary system for identifying external functions called by an untrusted application according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As detailed above, the instant disclosure relates generally to methods and systems for identifying external functions called by an untrusted application. In at least one embodiment, and as will be described in greater detail below, external functions to be called or imported by an untrusted application from a shared library may be identified by loading the untrusted application into an emulated computing environment, executing the untrusted application within the emulated computing environment, intercepting a request to access a region of memory that corresponds to external functions offered by the shared library (such as an export address table of the shared library) and identifying, by analyzing the request, an external function to be called or imported by the untrusted application.

Figure 2:
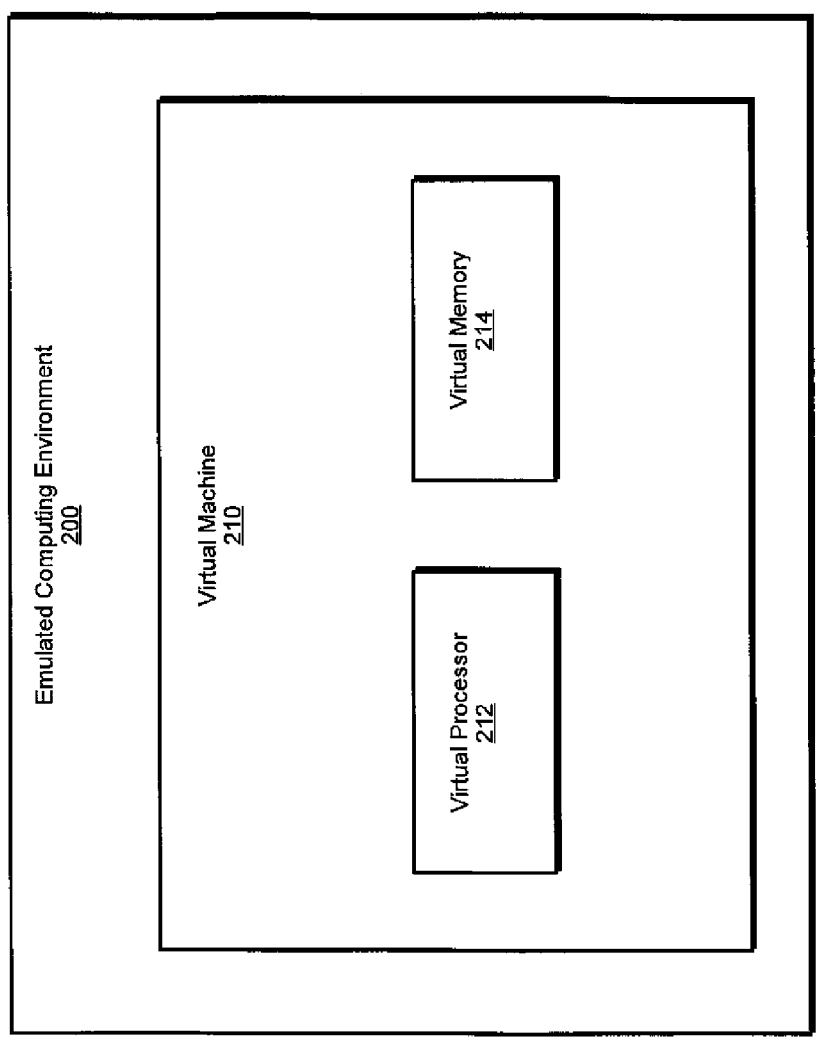
FIG. 2 is a block diagram of an exemplary emulated computing environment for loading and executing an untrusted application according to at least one embodiment.

The following will provide a detailed description of an exemplary untrusted application (FIG. 3A), an exemplary shared library (FIGS. 3A-3B), functions of which may be called by the untrusted application, an exemplary system for identifying the external functions called by the untrusted application (FIGS. 1, 7, and 8), and an exemplary emulated computing environment within which the untrusted application may be loaded an executed (FIG. 2). Detailed descriptions of various exemplary computer-implemented methods for identifying, using these systems and environments, external functions called by the untrusted application will also be provided in connection with FIGS. 4-6.

FIG. 1 is a block diagram of an exemplary system 100 for identifying external functions to be called by an untrusted application. As used herein, the term "untrusted," when used to described computer-executable instructions, applications, or programs, may generally refer to computer-executable instructions originating from an unknown or untrusted source. In many cases, the legitimacy of an untrusted application may be unknown. As will be described in greater detail below, exemplary system 100 may be used to verify the legitimacy of an untrusted application.

As illustrated in this figure, exemplary system 100 may comprise one or more modules 102 for performing one or more tasks required to identify the functions called by an untrusted application. For example, and as will be described in greater detail below in connection with FIGS. 2-6, exemplary system 100 may comprise an emulation module 104 for running an untrusted application within an emulated computing environment and a memory-access module 106 for intercepting a request from an untrusted application to access an external-function-specific region of memory. As used herein, the phrase "external-function-specific region of memory" may generally refer to a region of memory that corresponds to external functions offered by a shared library, such as an export address table for a DLL.

In at least one embodiment, exemplary system 100 may also comprise a function-identification module 108 for identifying, by analyzing requests intercepted by memory-access module 106, the names of external functions called by the untrusted application. Exemplary system 100 may also comprise an import-table-creation module 110 for creating or recreating an import table for the untrusted application based on the function names identified by function-identification module 108.

In certain embodiments, one or more of modules 102 may represent one or more software applications or programs that, when executed by a computing device, may cause the computing device to perform one or more tasks required to identify external functions called by an untrusted application. For example, as will be described in greater detail below, one or more of modules 102 may represent software modules configured to run on one or more computing devices, such as exemplary computing system 710 in FIG. 7 and/or one or more portions of network architecture 800 in FIG. 8. One or more of modules 102 may also represent all or portions of one or more special-purpose computers configured to perform one or more tasks necessary to identify the functions called by an untrusted application.

As detailed above, exemplary system 100 in FIG. 1 may be used to identify the external functions called by an untrusted application. For example, and as will be described in greater detail below in connection with FIGS. 4-6, exemplary system 100 may identify the external functions called by an untrusted application by: 1) loading the untrusted application into an emulated computing environment, 2) allowing the untrusted application to execute within the emulated computing environment, 3) intercepting a request from the untrusted application to access an external-function-specific region of memory, and 4) identifying, by analyzing the intercepted request, an external function to be called by the untrusted application.

FIG. 2 is a block diagram of an exemplary emulated computing environment 200 for safely executing an untrusted application. Emulated computing environment 200 generally represents any type or form of virtual or emulated computing environment. In at least one embodiment, emulated computing environment 200 may comprise a virtual machine 210 comprising a virtual processor 212 and virtual memory 214. Virtual machine 210 may represent an emulated MICROSOFT WINDOWS environment, an emulated APPLE MACINTOSH or OSX environment, an emulated UNIX environment, an emulated LINUX environment, or any other emulated computing environment. In certain embodiments, emulated computing environment 200 may be created by emulation module 104 in FIG. 1.

As will be described in greater detail below, in at least one embodiment computer-executable instructions, such as computer-executable instructions of an untrusted application, may be loaded into and executed by virtual machine 210. For example, virtual processor 212 of virtual machine 210 may execute, using virtual memory 214, computer-executable instructions of an untrusted application. As will be described in greater detail below, during emulation each request made by the untrusted application to access a region of virtual memory 214 that corresponds to external functions offered by a shared library (such as an export address table for a shared library) may be intercepted. In at least one embodiment, the identity of the external functions called by the untrusted application may be identified by analyzing this intercepted request. In certain embodiments, the untrusted application may be securely executed within virtual machine 210 in isolation from the remainder of the computing system.

Figure 3A:
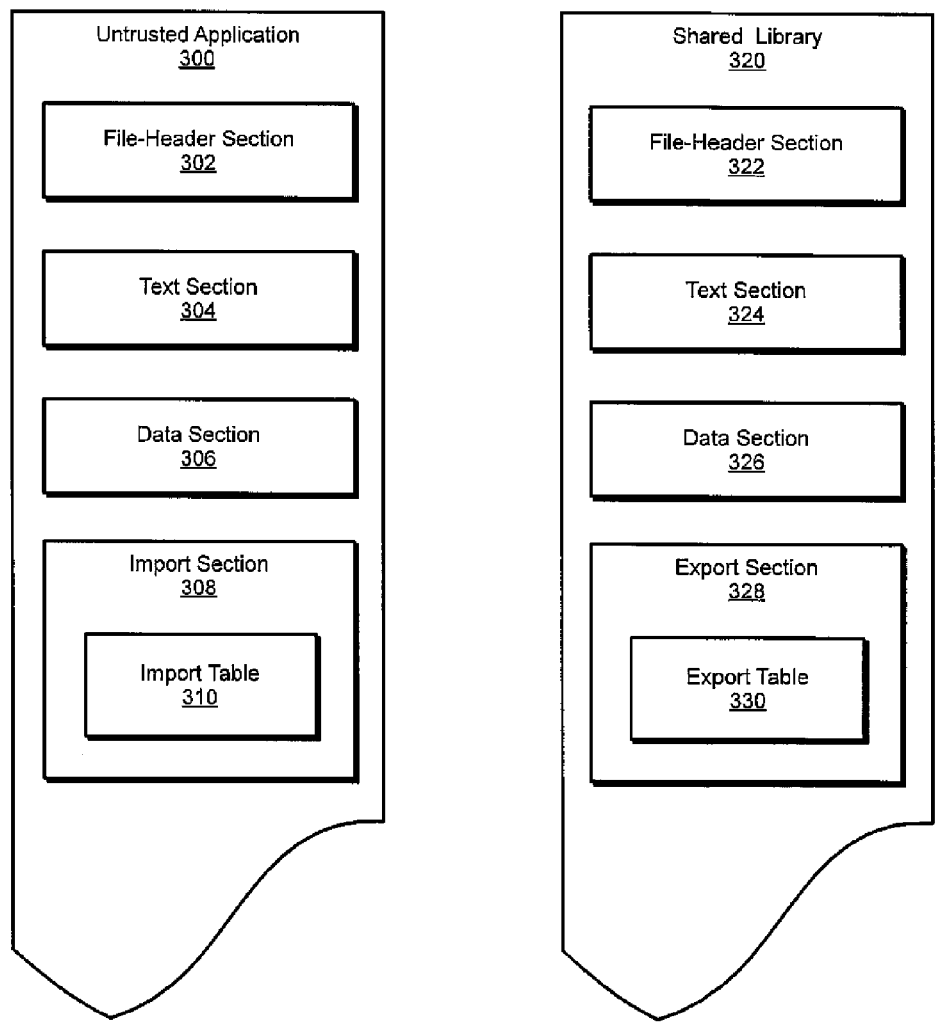
FIG. 3A is a block diagram of an exemplary untrusted application and an exemplary shared library.

FIG. 3A is a block diagram of an exemplary untrusted application 300 that may call external functions from a shared library 320. Untrusted application 300 generally represent any type or form of computer file. In certain embodiments, untrusted application 300 may represent an executable or compressed executable file. Untrusted application 300 may be also adapted for use in connection with one or more operating systems; including, for example, MICROSOFT operating systems, APPLE operating systems, UNIX operating systems, LINUX operating systems, or any other operating system.

In at least one embodiment, untrusted application 300 may be divided into one or more sections containing either code or data. For example, as illustrated in FIG. 3A, untrusted application 300 may comprise a file-header section 302 containing a file header, a text section 304 containing text or general-purpose code produced by a compiler or an assembler, and a data section 306 containing global and/or static variables that may be initialized when untrusted application 300 is compiled. Untrusted application 300 may also comprise an import section 308 comprising an import table 310 containing data that may be used by untrusted application 300 to call or import an external function.

In certain embodiments, import table 310 may contain, in place of a list of function names or addresses, a list of checksums associated with external functions to be called by untrusted application 300. As will be discussed in greater detail below, in certain embodiments untrusted application 300 may perform function-name resolution by attempting to match these checksums with checksums calculated based on export addresses associated with exported functions offered by a shared library. Import table 310 may also contain a corresponding list of file names that identify the name of the file in which the function to be called by untrusted application 300 is located.

In certain embodiments, untrusted application 300 may call or import various functions from shared library 320. Shared library 320 generally represents any type or form of shared library. Examples of shared library 320 include, without limitation, DLL files, DRV files, OCX files, or any other shared or dynamically linked library. As illustrated in FIG. 3A, shared library 320 may be divided into a plurality of sections containing code or data. For example, shared library 320 may comprise a file-header section 322, a text section 324 containing text or general-purpose code produced by a compiler or an assembler, and a data section 326 containing global and/or static variables that may be initialized when shared library 320 is compiled.

Figure 3B:
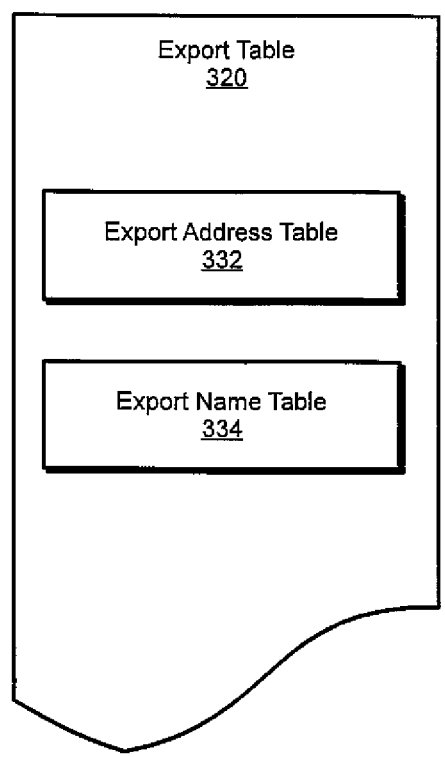
FIG. 3B is a block diagram of an exemplary export table for the exemplary shared library illustrated in FIG. 3A.

In at least one embodiment, shared library 320 may also comprise an export section 328 comprising an export table 330 that identifies functions that may be exported by shared library 320. As illustrated in FIG. 3B, in at least one embodiment export table 330 may comprise an export address table 332 that identifies an actual or relative address of each function that may be exported by shared library 320 and an export name table 334 that identifies the name of each function that may be exported by shared library 320.

Figure 4:
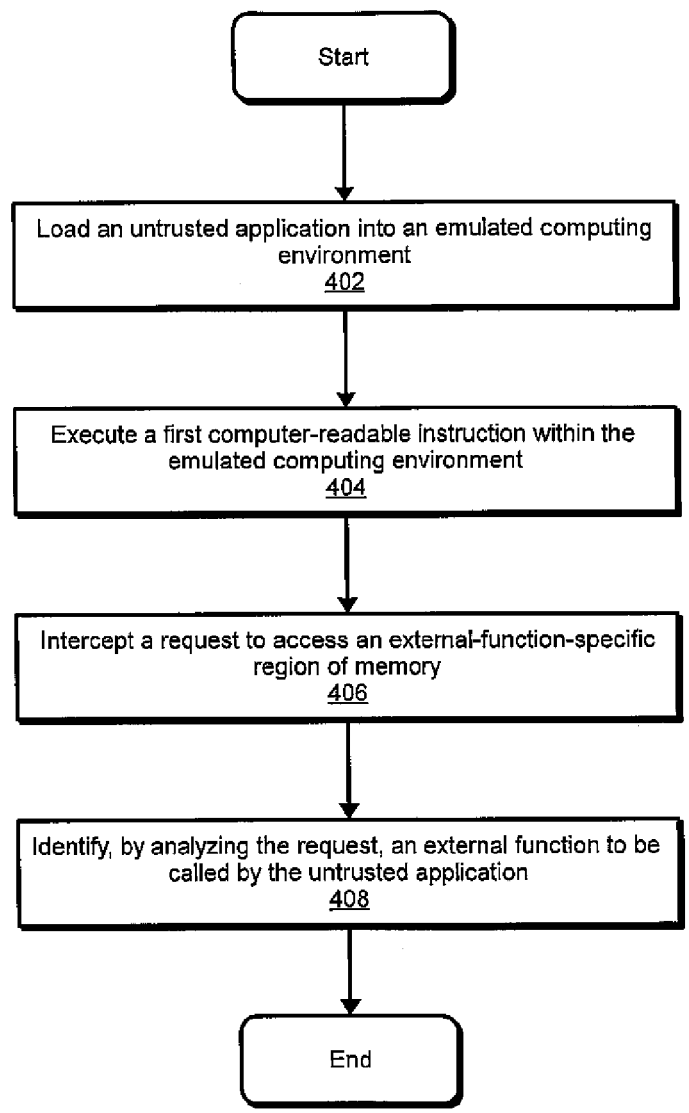
FIG. 4 is a flow diagram of an exemplary computer-implemented method for identifying external functions called by an untrusted application according to at least one embodiment.

FIG. 4 is a flow diagram of an exemplary computer-implemented method 400 for identifying external functions called by an untrusted application. As illustrated in this figure, at step 402 an untrusted application may be loaded into an emulated computing environment. For example, untrusted application 300 in FIG. 3A may be loaded into emulated computing environment 200 in FIG. 2. An untrusted application may be loaded into an emulated computing environment in a variety of ways. For example, in at least one embodiment, loading the untrusted application into the emulated computing environment may comprise storing the untrusted application in a buffer. As used herein, the phrase "buffer" may generally refer to a region of memory used to temporarily hold data.

In certain embodiments, the untrusted application may comprise at least a first computer-executable instruction. In this embodiment, at step 404 the first computer-readable instruction of the untrusted application may be executed within the emulated computing environment. This computer-readable instruction may be executed within the emulated computing environment in a variety of ways. For example, in certain embodiments, virtual processor 212 in FIG. 2 may execute the first computer-readable instruction. Moreover, in embodiments where loading the untrusted application into an emulated computing environment comprises storing the untrusted application in a buffer, executing the first computer-readable instruction within the emulated computing environment may comprise executing the first computer-readable instruction within the buffer. In at least one embodiment, executing the first computer-readable instruction within the emulated computing environment may comprise executing the first computer-readable instruction within virtual machine 210 in isolation from the remainder of a computing system.

At step 406, a request to access an external-function-specific region of memory may be intercepted. As detailed above, in certain embodiments the phrase "external-function-specific region of memory" may refer to a region of memory that corresponds to an export table of a shared library, such as export table 330 in FIG. 3A.

Figure 5:
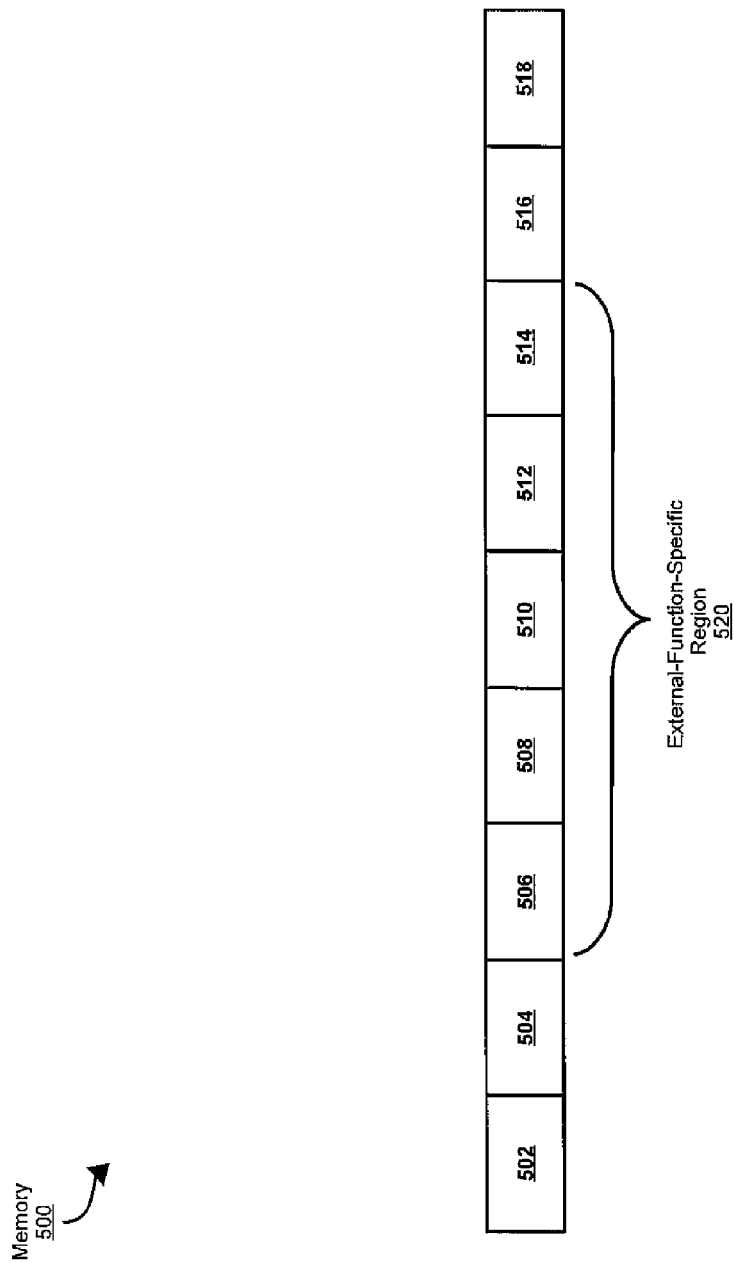
FIG. 5 is a block diagram an exemplary external-function-specific region of memory that may be accessed by an untrusted application in certain embodiments.

FIG. 5 is a block diagram an exemplary external-function-specific region 520 of memory 500 that may be accessed by an untrusted application, such as untrusted application 300 in FIG. 3A. As illustrated in this figure, memory 500 may comprise a plurality of memory locations 502-518. Memory locations 502-518 may represent any type or form of data structure. Examples of memory locations 502-518 include, without limitation, data blocks, segments, extents, pages, and the like.

In certain embodiments, memory locations 506-514 may correspond to entries in an export table (such as an export address table) of a shared library, such as export table 330 in FIG. 3A. In contrast, memory locations 502, 504, 516, and 518 may correspond to data that is not associated with an export table of a shared library. Accordingly, in this example, memory locations 506, 508, 510, 512, and 514 may represent an external-function-specific region 520 of memory 500.

Returning to FIG. 4, requests to access an external-function-specific region of memory, such as external-function-specific region 520 in FIG. 5, may be intercepted at step 406 in a variety of ways. For example, in certain embodiments, intercepting a request to access an external-function-specific region of memory may comprise intercepting a request to read data within an external-function-specific region of memory and/or intercepting a request to write data to an external-function-specific region of memory. For example, memory-access module 106 in FIG. 1 may monitor an external-function-specific region of virtual memory 214 in FIG. 2 and intercept any request from the untrusted application to read data from or write data to this region of memory.

At step 408, an external function to be called by the first computer-readable instruction may be identified by analyzing the intercepted request. In certain embodiments, identifying the external function to be called may comprise identifying an address associated with the external function and/or identifying a name associated with the external function. Upon completion of step 408, exemplary method 400 may terminate.

As will be described in greater detail below, an external function to be called by the untrusted application may be identified in a variety of ways. For example, as will be described in greater detail below in connection with FIG. 6, in certain embodiments an external function to be called by the untrusted application from a shared library may be identified by monitoring a region of memory that corresponds to an export address table for the shared library and then identifying each specific memory location within this region of memory that is accessed by the untrusted application. An entry in the export address table for the shared library that corresponds to the memory location accessed by the untrusted application may then be identified. Upon identifying this entry in the export address table, the name of the function may be determined by identifying an entry in an export name table of the shared library that is associated with the entry in the export address table that corresponds to the specific memory location accessed by the untrusted application. This entry in the export name table may identify, or point to, the name of the external function called by the untrusted application.

For the sake of clarity, and by way of example only, the following detailed description will provide, with reference to FIGS. 1-5 an illustration of how exemplary method 400 may be implemented. In this example, one or more of modules 102 in FIG. 1 may be installed and configured to run on a computing device, such as computing system 710 in FIG. 7. In this example, at step 402 emulation module 104 may create emulated computing environment 200 within computing system 710. Upon creating emulated computing environment 200, computing system 710 may load untrusted application 300 into emulated computing environment 200.

At step 404, a first computer-readable instruction of untrusted application 300 may be executed by virtual processor 212 of virtual machine 210 within emulated computing environment 200. At step 406, memory-access module 106 may intercept a request from untrusted application 300 to access an external-function-specific region of virtual memory 214. For example, memory-access module 106 may intercept a request from untrusted application 300 to access memory location 508 within external-function-specific region 520 in FIG. 5. In this embodiment, memory location 508 may correspond to an entry in export address table 332 within export table 330 of shared library 320.

At step 408, function-identification module 108 may identify the memory location specified in the request intercepted by memory-access module 106 from untrusted application 300. For example, function-identification module 108 may determine that untrusted application 300 requested access to memory location 508 within external-function-specific region 520 in FIG. 5. Upon identifying the memory location specified in the intercepted request, function-identification module 108 may identify an entry in export address table 332 that corresponds to memory location 508 specified in the intercepted request.

Upon identifying an entry in export address table 332 that corresponds to memory location 508, function-identification module 108 may identify an entry in export name table 334 that is associated with the entry in export address table 332 that corresponds to memory location 508. This entry in export name table 334 may contain, or point to, a name of a function, such as "GetFileAttributes" or "strlen." Upon completion of step 408, exemplary method 400 may terminate.

Figure 6:
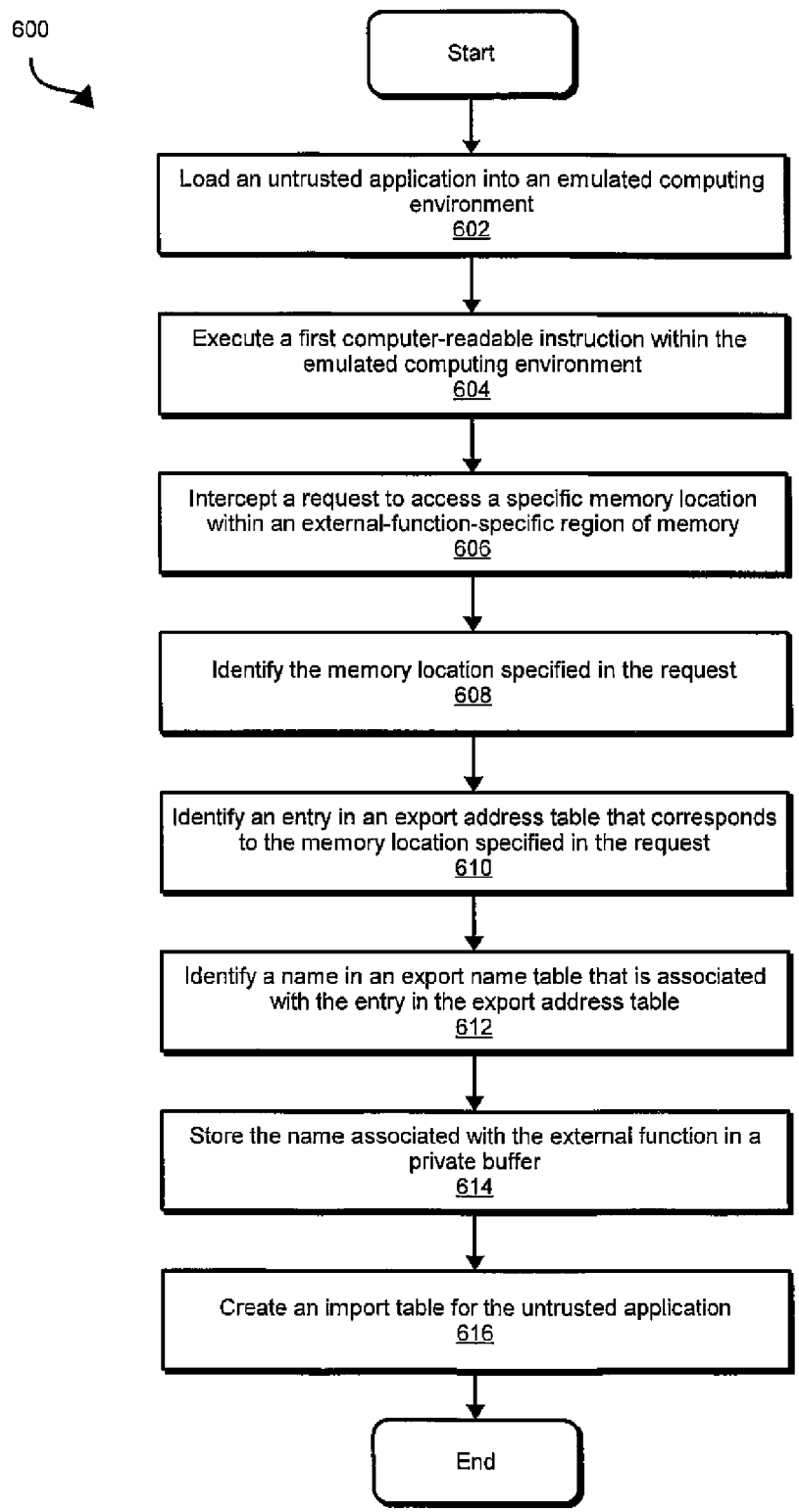
FIG. 6 is a flow diagram of an exemplary computer-implemented method for identifying external functions called by an untrusted application according to an additional embodiment.

As detailed above, the various external functions called by an untrusted application may be identified and then used to recreate an import table for the untrusted application. FIG. 6 is a flow diagram of an exemplary computer-implemented method 600 for identifying external functions called by an untrusted application and then recreating an import table for the untrusted application based on the external functions that are identified. As illustrated in this figure, at step 602 an untrusted application may be loaded into an emulated computing environment, such as emulated computing environment 200 in FIG. 2. At step 604, a first computer-readable instruction of the untrusted application may be executed within the emulated computing environment.

At step 606, a request to access a specific memory location within an external-function-specific region of memory may be intercepted. For example, memory-access module 106 may intercept a request from untrusted application 300 to access memory location 508 within external-function-specific region 520 of virtual memory 214. At step 608, the memory location specified in the intercepted request may be identified. For example, function-identification module 108 may identify memory location 508 as the memory location that was specified in the request intercepted by memory-access module 106.

At step 610, an entry in an export address table that corresponds to the memory location specified in the intercepted request may be identified. For example, function-identification module 108 may identify an entry in export address table 332 in FIG. 3B that corresponds to memory location 508 in FIG. 5. At step 612, an entry in an export name table that is associated with the entry in the export address table identified in step 610 may be identified. For example, function-identification module 108 may identify an entry in export name table 334 that is associated with the entry in export address table 332 in FIG. 3B that corresponds to memory location 508 in FIG. 5. In at least one embodiment, this entry in the export name table may contain, or point to, a name of a function.

At step 614, import-table-creation module 110 may store the identified function's name in a private buffer. The phrase "private buffer" generally refers to a memory location that may not be accessed by an untrusted application, such as untrusted application 300 in FIG. 3A. At step 616, an import table for the untrusted application may be recreated. For example, import-table-creation module 110 may create, based on the function names stored in the private buffer, an import table that lists, by name, each of the external functions called by untrusted application 300 in FIG. 3A. In at least one embodiment, this import table may comprise an import name table that identifies the names of each external function called or imported by untrusted application 300. This import table may also comprise an import address table that identifies or points to the addresses or relative addresses for each of the external functions called or imported by untrusted application 300. Upon completion of step 616 in FIG. 6, exemplary method 600 may terminate.

The external functions called or imported by the untrusted application may represent any type or form of external function. For example, external functions may represent an operating-system service, a function offered by a shared library, such as a DLL, or any other function. In addition, although not illustrated, exemplary methods 400 and/or 600 may also comprise executing, and intercepting requests from, more than one computer-readable instruction of the untrusted application.

Figure 7:
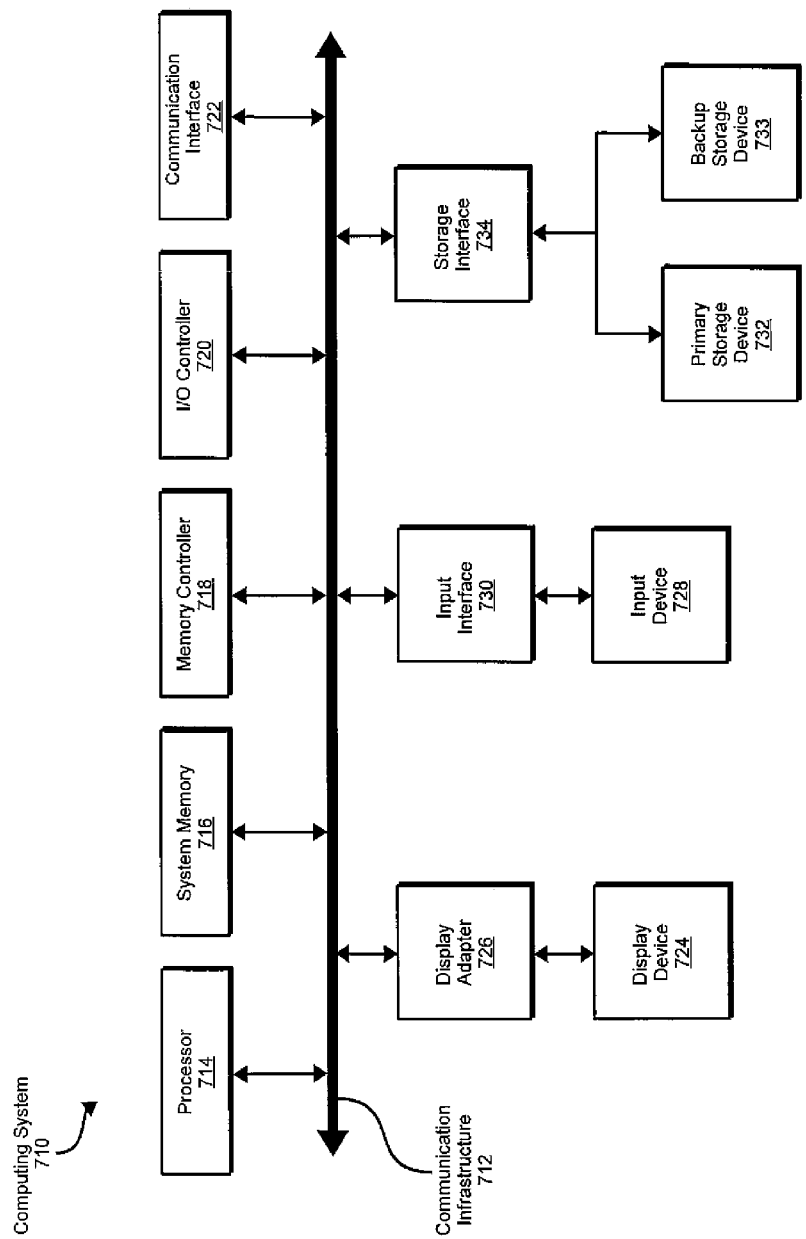
FIG. 7 is a block diagram of an exemplary computing system capable of implementing one or more of the embodiments described and/or illustrated herein.
Figure 8:
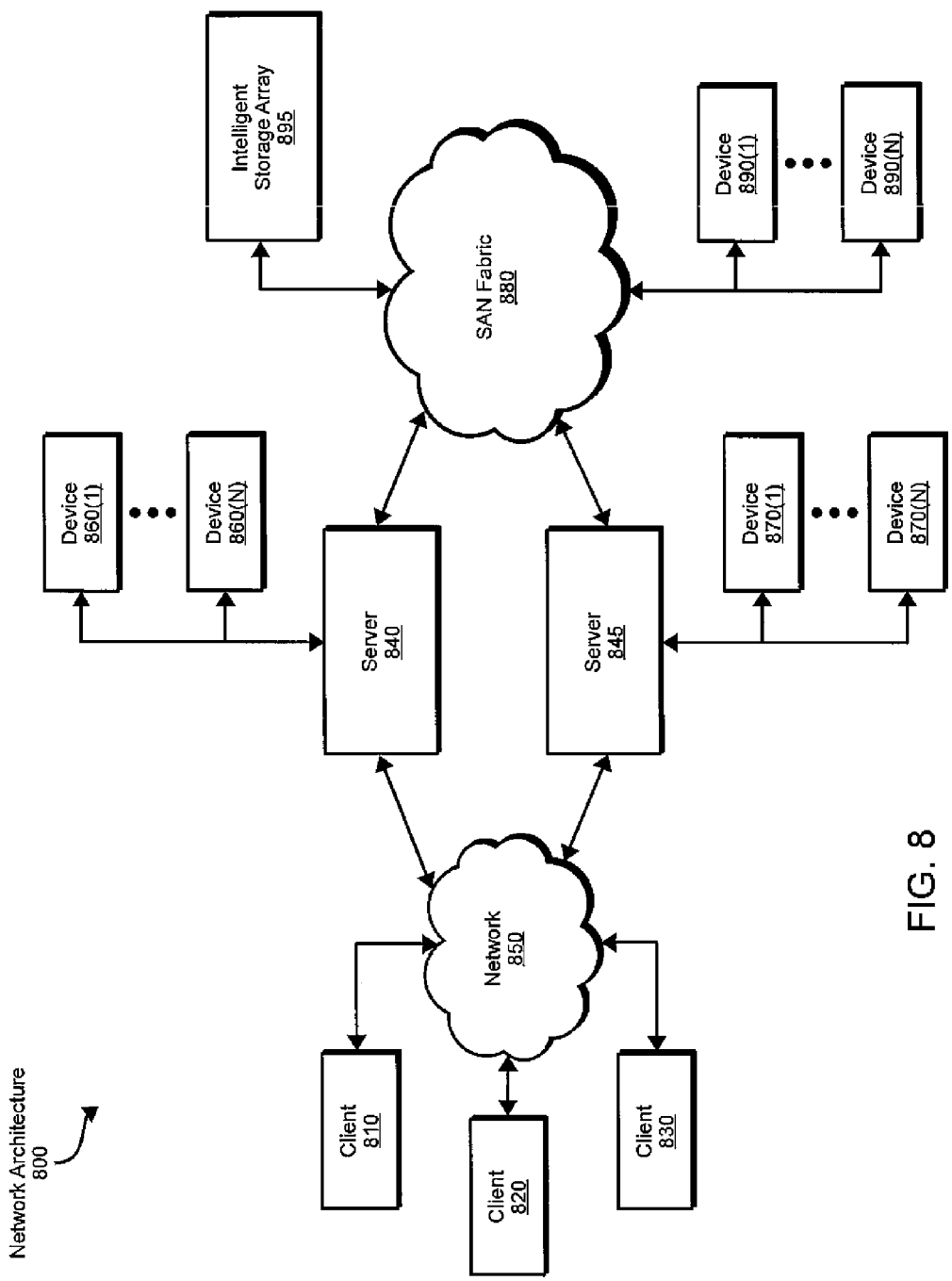
FIG. 8 is a block diagram of an exemplary computing network capable of implementing one or more of the embodiments described and/or illustrated herein.

Exemplary system 100 in FIG. 1 and/or exemplary methods 400 and 600 in FIGS. 4 and 6, respectively, may be deployed in a variety of ways. For example, all or a portion of exemplary system 100 in FIG. 1 may represent portions of a client-bases system or a network-based system. FIG. 7 is an illustration of an exemplary client-based system capable of implementing one or more of the embodiments described and/or illustrated herein. In contrast, FIG. 8 is an illustration of an exemplary network-bases system capable of implementing one or more of the exemplary embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the loading, executing, intercepting, identifying, storing, creating, and preventing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as loading, executing, intercepting, identifying, storing, creating, and preventing.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the loading, executing, intercepting, identifying, storing, creating, and preventing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the loading, executing, intercepting, identifying, storing, creating, and preventing steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the loading, executing, intercepting, identifying, storing, creating, and preventing steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the loading, executing, intercepting, identifying, storing, creating, and preventing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments descried and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the loading, executing, intercepting, identifying, storing, creating, and preventing steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. In one embodiment, this exemplary computer-implemented method may comprise loading an untrusted application into an emulated computing environment, executing a first computer-readable instruction of the untrusted application within the emulated computing environment, intercepting a request to access an external-function-specific region of memory, and identifying, by analyzing the request, an external function to called by the first computer-readable instruction.

In certain embodiments, loading the untrusted application into the emulated computing environment may comprise storing the untrusted application in a buffer. Similarly, executing the first computer-readable instruction within the emulated computing environment may comprise executing the first computer-readable instruction within the buffer. In at least one embodiment, identifying the external function to be called may comprise identifying an address associated with the external function and/or identifying a name associated with the external function.

In certain embodiment, the intercepted request may comprise a request to access a specific memory location within the external-function-specific region of memory. In addition, identifying the address associated with the external function may comprise identifying the memory location specified in the intercepted request and identifying an entry in an export address table that corresponds to the memory location specified in the intercepted request. In at least one embodiment, identifying the name associated with the external function may comprise identifying an entry in an export name table that is associated with the entry in the export address table.

In certain embodiments, the external-function-specific region of memory may correspond to an export table for at least one dynamically linked library, which may contain an entry associated with the external function. In addition, intercepting the request to access the external-function-specific region of memory may comprise intercepting a request to read data within the external-function-specific region of memory and/or a request to write data to the external-function-specific region of memory.

The external function may be an operating-system service, a library function, or any other function. In addition, the method may further comprise storing the name associated with the external function in a private buffer. In addition, the method may further comprise creating an import table for the untrusted application that identifies at least the external function to be called by the first computer-readable instruction. In certain embodiments, this import table may comprise an import name table and an import address table.

The method may also further comprise executing a second computer-readable instruction of the untrusted application within the emulated computing environment, intercepting a second request to access the external-function-specific region of memory, and identifying, by analyzing the second request, a second external function to be called by the second computer-readable instruction. In certain embodiments, the method may also further comprise preventing the untrusted application from accessing the external-function-specific region of memory.

Computing system 710 and/or one or more of the components of network architecture 800 may also represent all or portions of exemplary system 100 in FIG. 1. For example, computing system 710 and/or one or more of the components of network architecture 800 may represent portions of a system for identifying external functions called by an untrusted application that comprises an emulation module for: 1) loading an untrusted application into an emulated computing environment and 2) executing at least a first computer-readable instruction of the untrusted application within the emulated computing environment. The system may also comprise a memory-access module for intercepting a request to access an external-function-specific region of memory and a function-identification module for identifying, by analyzing the request, an external function to be called by the first computer-readable instruction.

This system may also comprise an import-table-creation module for creating an import table for the untrusted application. In certain embodiments, this import table may identify at least the external function to be called by the first computer-readable instruction. In addition, the function-identification module may identify the external function to be called by identifying an address associated with the external function and/or a name associated with the external function.

As detailed above, all or portions of exemplary system in FIG. 1 may represent a software application or program that, when executed by a computing device, may cause the computing device to perform one or more tasks required to identify external functions called by an untrusted application. In this embodiment, all or portions of exemplary system 100 in FIG. 1 may represent computer-readable media comprising one or more computer-executable instructions that, when executed by a computing device, may cause the computing device to load an untrusted application into an emulated computing environment, execute a first computer-readable instruction of the untrusted application within the emulated computing environment, intercept a request to access an external-function-specific region of memory, and identify, by analyzing the request, an external function to be called by the first computer-readable instruction.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying external functions called by an untrusted application, comprising:
    loading an untrusted application into an emulated computing environment, wherein:
        the untrusted application comprises at least one computer-executable instruction that calls an external function;
        the untrusted application obfuscates the name of the external function to be called by the computer-executable instruction by replacing the name of the external function with a checksum;
    executing the computer-readable instruction within the emulated computing environment;
    intercepting a request to access a specific memory location within an external-function-specific region of memory;
    identifying, by analyzing the request, the name of the external function to be called by the computer-readable instruction by:
        identifying the memory location specified in the request;
        identifying an entry in an export address table that corresponds to the memory location specified in the request;
    storing the name of the external function to be called by the computer-readable instruction within a private memory location that cannot be accessed by the untrusted application;
    recreating an import table for the untrusted application based at least in part on the name of the external function stored within the private memory location.

2. The method of claim 1, wherein:
    loading the untrusted application into the emulated computing environment comprises storing the untrusted application in a buffer;
    executing the computer-readable instruction within the emulated computing environment comprises executing the computer-readable instruction within the buffer.

3. The method of claim 1, wherein identifying the name of the external function to be called comprises identifying an address associated with the external function.

4. The method of claim 1, wherein identifying the name of the external function comprises identifying an entry in an export name table that is associated with the entry in the export address table.

5. The method of claim 1, wherein the external-function-specific region of memory corresponds to an export table containing an entry associated with the external function.

6. The method of claim 1, wherein the external-function-specific region of memory corresponds to an export table for at least one shared library.

7. The method of claim 1, wherein intercepting the request to access the external-function-specific region of memory comprises intercepting at least one of:
    a request to read data within the external-function-specific region of memory;
    a request to write data to the external-function-specific region of memory.

8. The method of claim 1, wherein the external function is an operating-system service.

9. The method of claim 1, wherein the external function is a library function.

10. The method of claim 1, further comprising:
    executing at least one additional computer-readable instruction of the untrusted application within the emulated computing environment;
    intercepting at least one additional request to access the external-function-specific region of memory;
    determining, by analyzing the additional request, an obfuscated name of an additional external function to be called by the additional computer-readable instruction.

11. The method of claim 1, wherein the import table comprises:
    an import name table;
    an import address table.

12. The method of claim 1, further comprising preventing the untrusted application from accessing the external-function-specific region of memory.

13. A system for identifying external functions called by an untrusted application, the system comprising:
    an emulation module programmed to:
        load an untrusted application into an emulated computing environment, wherein the untrusted application comprises at least one computer-executable instruction that calls an external function and the untrusted application obfuscates the name of the external function to be called by the computer-executable instruction by replacing the name of the external function with a checksum;
        execute the computer-readable instruction within the emulated computing environment;

a memory-access module programmed to intercept a request to access a specific memory location within an external-function-specific region of memory;
   a function-identification module programmed to identify, by analyzing the request, the name of the external function to be called by the computer-readable instruction by:
      identifying the memory location specified in the request;
      identifying an entry in an export address table that corresponds to the memory location specified in the request;
   an import-table-creation module programmed to:
      store the name of the external function to be called by the computer-readable instruction within a private memory location that cannot be accessed by the untrusted application;
      recreate an import table for the untrusted application based at least in part on the name of the external function stored within the private memory location;
at least one processor configured to execute the emulation module, the memory-access module, and the function-identification module.

14. The system of claim 13, wherein the function-identification module identifies the name of the external function to be called by identifying an address associated with the external function.

15. A non-transitory computer-readable medium comprising one or more computer-executable instructions that, when executed by a computing device, cause the computing device to:

load an untrusted application into an emulated computing environment, wherein the untrusted application comprises at least one computer-executable instruction that calls an external function and the untrusted application obfuscates the name of the external function to be called by the computer-executable instruction by replacing the name of the external function with a checksum;

execute the computer-readable instruction within the emulated computing environment;

intercept a request to access a specific memory location within an external-function-specific region of memory;

identify, by analyzing the request, the name of the external function to be called by the computer-readable instruction by:
   identifying the memory location specified in the request;
   identifying an entry in an export address table that corresponds to the memory location specified in the request;

store the name of the external function to be called by the computer-readable instruction within a private memory location that cannot be accessed by the untrusted application;

recreate an import table for the untrusted application based at least in part on the name of the external function stored within the private memory location.

* * * * *